United States Patent [19]

Radev et al.

[11] Patent Number: 4,740,990
[45] Date of Patent: Apr. 26, 1988

[54] GRAPHITE ELECTRODE WITH PROTECTIVE COATING AND METHOD FOR ITS PRODUCTION

[75] Inventors: Rumen B. Radev; Alexander Y. Vulchev; Vasil G. Peev, all of Sofia, Bulgaria

[73] Assignee: NPP PO Elektrotermia, Sofia, Bulgaria

[21] Appl. No.: 925,888

[22] Filed: Oct. 30, 1986

[30] Foreign Application Priority Data

Nov. 27, 1985 [BG] Bulgaria .................................. 72518

[51] Int. Cl.$^4$ .............................................. H05B 7/08
[52] U.S. Cl. .................................................... 373/88
[58] Field of Search .............................. 373/88, 91, 93; 219/145.1

[56] References Cited

U.S. PATENT DOCUMENTS

| | | | |
|---|---|---|---|
| 4,351,056 | 9/1982 | Kiikka et al. | 373/88 |
| 4,383,321 | 5/1983 | Schieber et al. | 373/88 |
| 4,530,853 | 7/1985 | Lewallen et al. | 373/88 |

Primary Examiner—Roy N. Envall, Jr.
Attorney, Agent, or Firm—Karl F. Ross; Herbert Dubno

[57] ABSTRACT

A graphite electrode with protective coating, consisting of a single- or multilayer metallic or metal-oxide coating, and a graphite layer containing graphite, vinyl-acetate as binder and methyl cellulose as thickener, this surface layer being compacted by means of a pressure roller or a vibration tool.

2 Claims, 1 Drawing Sheet

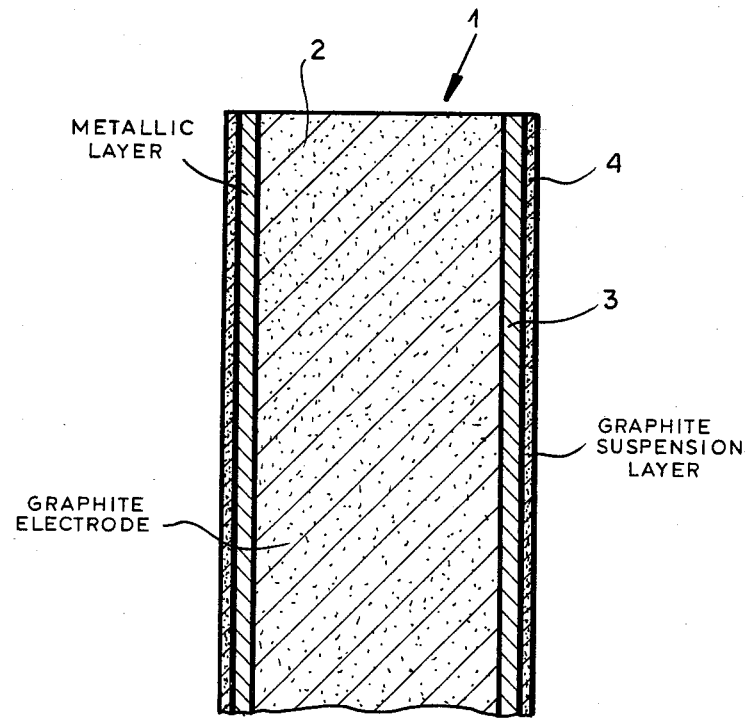

GRAPHITE ELECTRODE WITH PROTECTIVE COATING AND METHOD FOR ITS PRODUCTION

This invention relates to a graphite electrode with protective coating for steelmaking electric arc furnaces and a method for its production.

There are known electrodes with protective coating made up of aluminium with alloying admixtures treated with electric arc (1). The drawback of such coatings lies in that as a result of the direct contact of the aluminium coating and the metal contact grip there occurs a partial welding together of the aluminium coating to the metallic (copper) contact grip. The surface burns up strongly and the contact grip must be replaced.

Another solution of this problem is searched by the use of graphite segments (2) between the graphite electrode with aluminium coating and the metal contact grip. A drawback of this method lies in that its use is in certain cases impossible or requires considerable reconstructions of the furnaces.

There is also known the application of a surface graphite layer onto the protective coating (1). In direct contact between the coating and the copper contact grip the welding together between them is reduced, but cannot be fully avoided.

There is known a graphite electrode with a coating of aluminium alloy, which has a surface layer of graphite with phenolicnovolac resin as binder, and polyvinyl alcohol is used as an adhesive agent (3). In its production the powdered materials are mixed with water, the polyvinyl alcohol being dissolved, and there is obtained a suspension of graphite and phenolic-novolac resin. This suspension is sprayed onto the protective coating. For the hardening of the surface layer there is necessary a temperature of from 150° to 180° C. The main drawback of this surface layer lies in its high contact resistance. The phenolic-novolac resin is insoluble in water, and this requires its use in quantities of from 15 to 30% with respect to the graphite, which means an introduction of considerable concentrations of non-conductive material.

In a superhigh-power furnace at 60,000 A, the power generated in the contact zone in the case of a coating with graphite layer and a copper contact grip reaches 120 to 180 kW; this causes local overheatings resulting in that the aluminium is molten. it penetrates through the graphite layer and is alloyed with the copper. Another drawback lies in the requirement for the temperature of the electrode during the application of the surface layer to be of from 150° to 180° C. If the temperature is lower than 150° C. the phenolic-novolac mixture does not polymerize, and the obtained surface layer has a very low mechanical strength and falls off to a great extent during transportation and handling of the electrodes.

The aforedescribed electrode (3) does not show in industrial application any advantages as compared to the direct contact, and also the known graphite layer (1) does not ensure a failure-free extended operation of the contact grips with electrodes with protective coating.

It is therefore a general object of this invention to develop a compact protective coating onto the metallic or metal-oxide surface layer of graphite electrodes and a method for its application, reducing at that several times the contact resistance and, respectively, the power generated in the interface between the graphite electrode and the metal contact grip, ensuring that the mechanical endurance of the graphite layer meets the service requirements in the use of protective electrodes.

This object is achieved by the application onto a graphite electrode, protected by a single- or multilayer metallic or metal-oxide coating, a graphite suspension which contains of from 100 to 1500 g graphite with a grain size of up to 2 mm, of from 20 to 150 g water-soluble vinyl-acetate adhesive, of from 10 to 80 g water-soluble methyl cellulose thickener, and from of 1000 to 1600 g water. The indicated quantities are for a surface of 1 $m^2$. The application of the graphite suspension is effected by spraying, spreading or by another suitable means. The applied graphite layer is subjected to a mechanical treatment for compacting its structure by means of a pressure roller, a vibration tool or by another suitable means.

The advantages of the method according to this invention lie in that the compacted graphite layer has a 3 to 5 times lower contact resistance or, respectively, reduced power generated in the contact heads and has a sufficient mechanical endurance to meet the service requirements for the use of protected graphite electrodes.

For a better understanding of the invention, it will be explained by means of the following examples.

EXAMPLE 1

Onto the uppermost layer of a graphite electrode protected by a single- or multilayer metallic protective coating there is applied by spraying a suspension containing 700 g of graphite with a grain size of up to 1 mm, 35 g of a water-soluble vinyl-acetate adhesive, 25 g of water-soluble methyl cellulose and 1350 $cm^3$ of water.

The applied and not fully dried layer is compacted at a temperature of the electrode of about 100° C. by rolling with a metal roller.

EXAMPLE 2

Onto the uppermost layer of a graphite electrode protected by a single- or multilayer metal-oxide coating there is applied by spraying a suspension containing: 1000 g electrographite with a grain size of up to 1.5 mm, 45 g of a water-soluble vinyl-acetate adhesive, 20 g of water-soluble methiyl cellulose and 1000 $cm^3$ of water.

The applied and not fully dried layer is compacted at a temperature of the electrode of about 100° C. with a vibration tool.

The graphite electrodes with compacted protective graphite layer according to examples 1 and 2 are featured by a 3 to 5 times reduced contact resistance—the voltage drop in the contact surfaces is of from 550 to 1300 mV at a current density of 50 $A/cm^2$.

We claim:

1. A coated electrode comprising:
   a graphite electrode;
   a metallic or metal-oxide layer coating said electrode; and
   a compacted graphite layer containg a binder coating said metallic or metal-oxide layer, wherein said graphite layer contains graphite with a grain size of up to 2 mm in a quantity of 200 to 2000 $g/m^2$, a water-soluble vinyl-acetate as a binder of from 2 to 20% by weight, and methyl cellulose as a thickener of from 1 to 10% by weight.

2. A method for producing a coated electrode comprising the steps of:
   forming a graphite electrode;

coating said electrode with a metallic or metal-oxide layer;

coating said metallic or metal-oxide layer with a graphite suspension layer, wherein said graphite layer contains graphite with a grain size of up to 2 mm in a quantity of 200 to 2000 g/m², a water-soluble vinyl-acetate as a binder of from 2 to 20% by weight, and methyl cellulose as a thickener of from 1 to 10% by weight upon drying; and subjecting said graphite layer to mechanical compaction by means of a pressure roller or a vibration tool.

* * * * *